(12) United States Patent
Hubbard

(10) Patent No.: US 6,608,749 B2
(45) Date of Patent: Aug. 19, 2003

(54) PORTABLE COMPUTER PEDESTAL METHOD AND APPARATUS

(75) Inventor: David Arthur Hubbard, Austin, TX (US)

(73) Assignee: MDS Advertising, Inc., Austin, TX (US)

(*) Notice: Subject to any disclaimer, the term of this patent is extended or adjusted under 35 U.S.C. 154(b) by 0 days.

(21) Appl. No.: 09/798,873

(22) Filed: Mar. 1, 2001

(65) Prior Publication Data
US 2002/0122291 A1 Sep. 5, 2002

(51) Int. Cl.⁷ .................................................. G06F 1/16
(52) U.S. Cl. ..................... 361/683; 361/687; 312/223.1; 248/920
(58) Field of Search ......................... 361/683, 679–682, 361/684–687; 312/223.1–223.3; 248/917–923, 122, 122.1, 124.1

(56) References Cited

U.S. PATENT DOCUMENTS

| | | | | |
|---|---|---|---|---|
| 6,266,236 B1 | * | 7/2001 | Ku et al. | 361/681 |
| 6,266,241 B1 | | 7/2001 | Van Brocklin et al. | 361/687 |
| 6,290,534 B1 | | 9/2001 | Sadler | 439/534 |
| 6,309,230 B2 | * | 10/2001 | Helot | 439/131 |
| 6,430,038 B1 | * | 8/2002 | Helot et al. | 361/681 |
| 6,490,154 B2 | | 12/2002 | Thompson | 361/686 |
| D469,775 S | | 2/2003 | Bradley | D14/434 |
| 2002/0003197 A1 | | 1/2002 | MacEachern | 248/346.01 |
| 2002/0100398 A1 | | 8/2002 | Santini | 108/157.1 |
| 2002/0122290 A1 | | 9/2002 | Davis, IV | 361/683 |
| 2002/0122291 A1 | | 9/2002 | Hubbard | 361/683 |
| 2003/0052857 A1 | | 3/2003 | Pappas | 345/156 |
| 2003/0063059 A1 | | 4/2003 | Farrow et al. | 345/92 |

* cited by examiner

*Primary Examiner*—Darren Schuberg
*Assistant Examiner*—Hung Van Duong
(74) *Attorney, Agent, or Firm*—Fulbright & Jaworski, LLP

(57) ABSTRACT

A support apparatus and method for providing ergonomic viewing positions to portable devices such as a portable computer. In an exemplary embodiment, a pedestal generally includes a base having a recess formed to receive a portable device, an anchor movably coupled to the base, and a support pivotally coupled to the base. The portable device may include a desktop portion and a display portion. The anchor may be formed to engage the portable device when the desktop portion of the portable device is disposed in the recess of the base. The support may extend upwardly from the base for holding the display portion of the portable device. According to one aspect of invention, the support apparatus and method provide advantages in that viewability of a laptop computer can be readily extended by ergonomically orienting the laptop computer through the use of a portable pedestal.

29 Claims, 17 Drawing Sheets

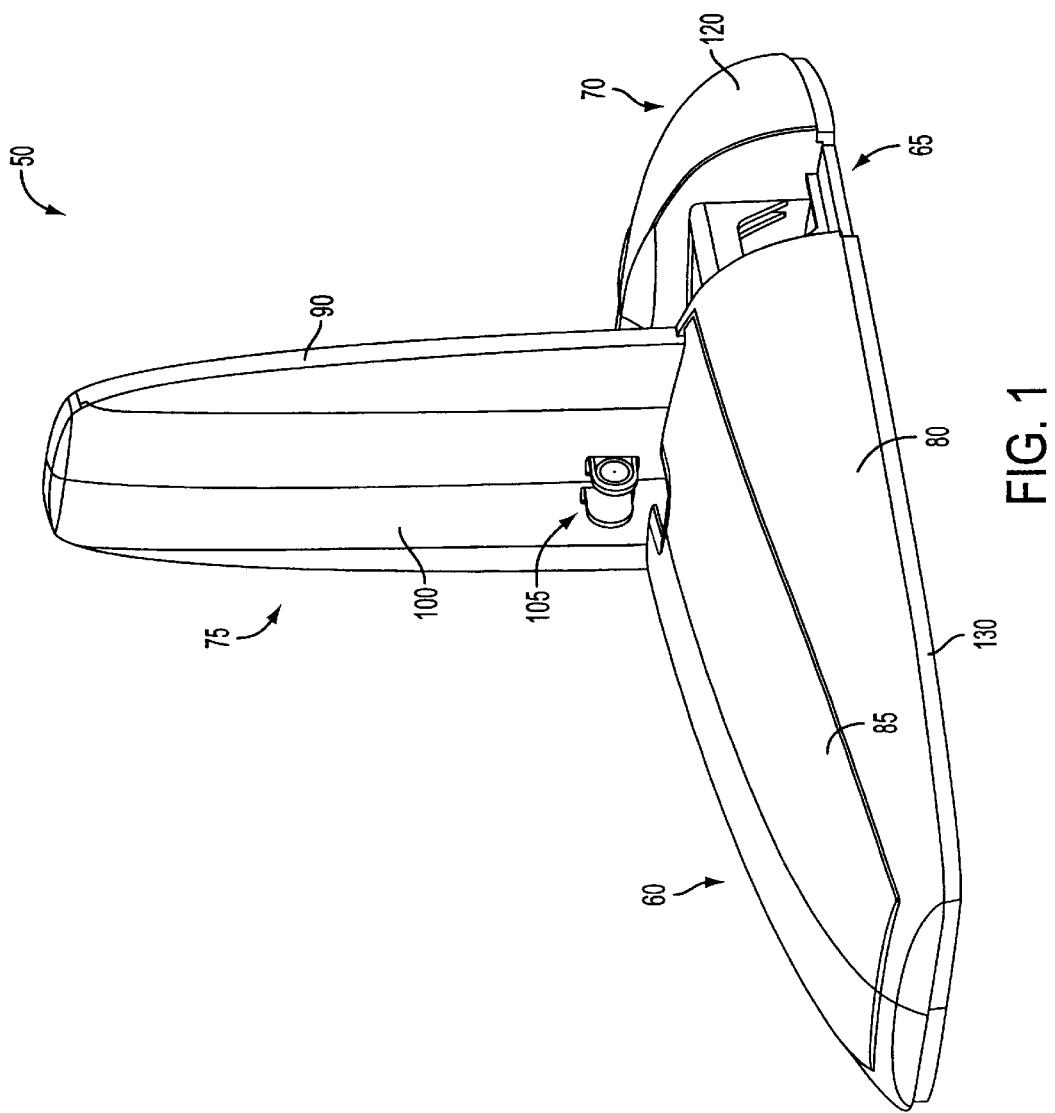

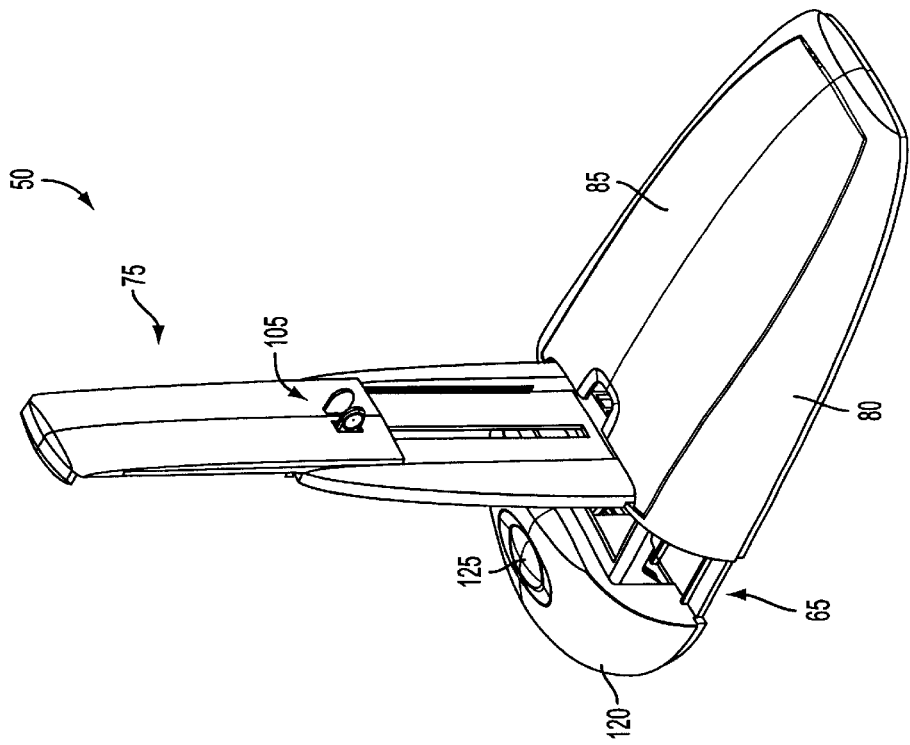
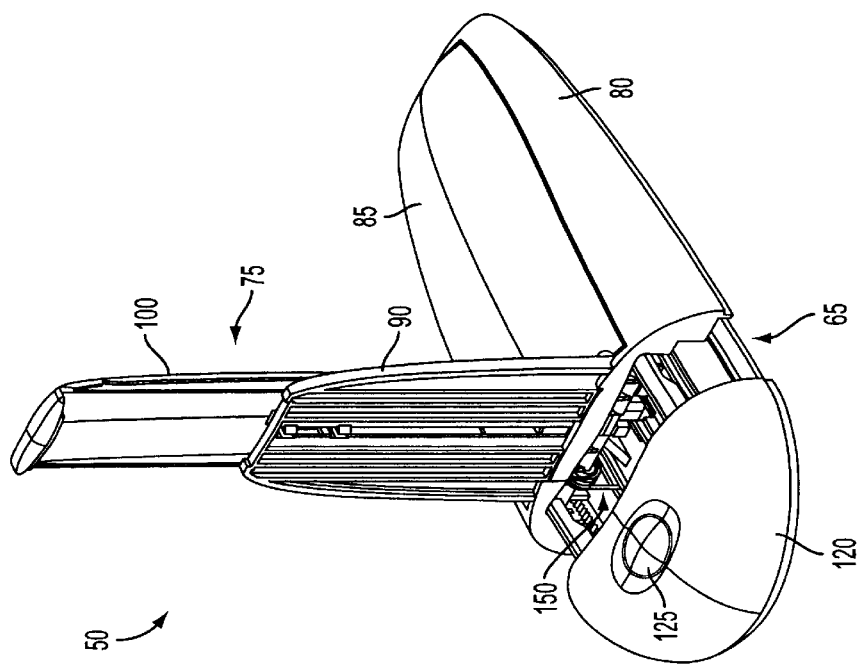

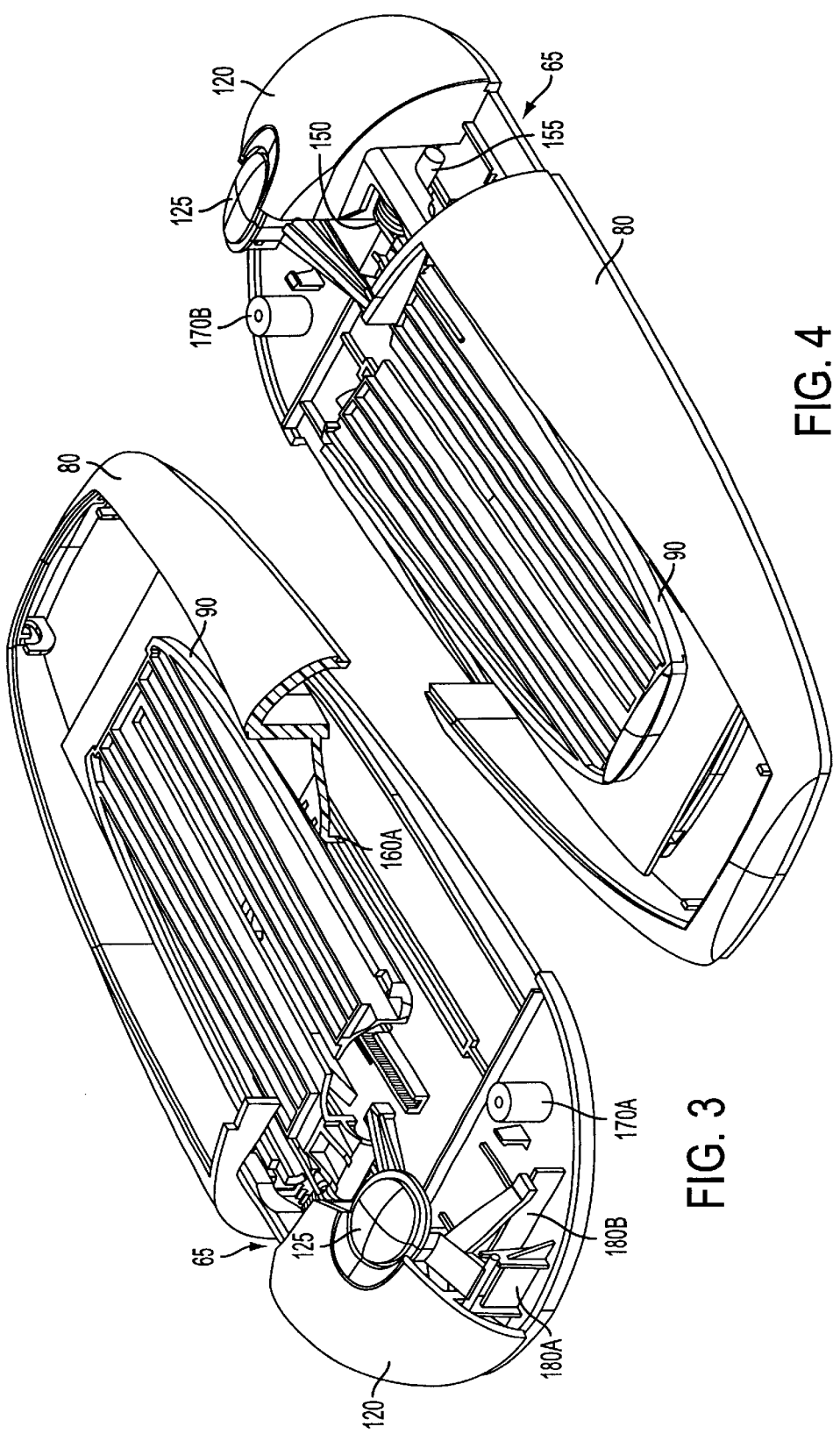

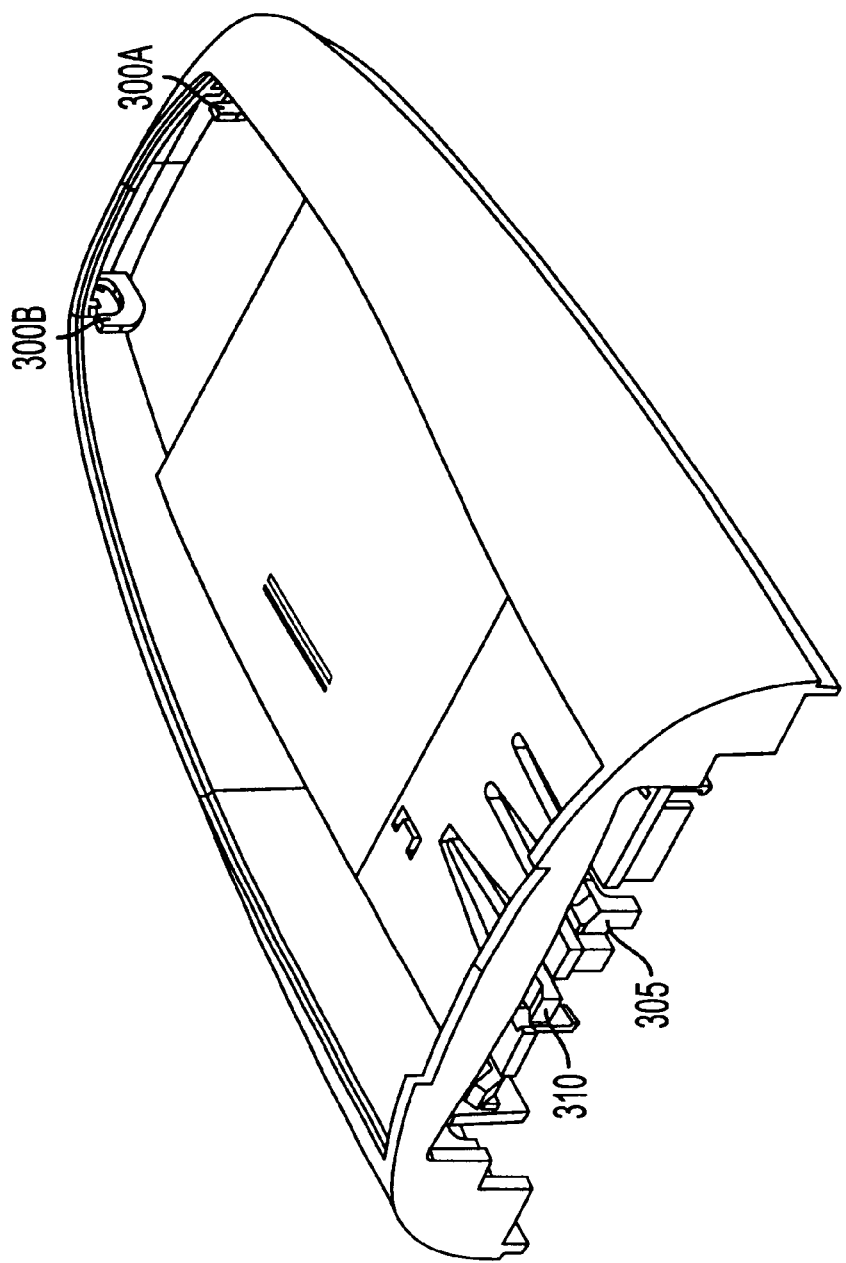

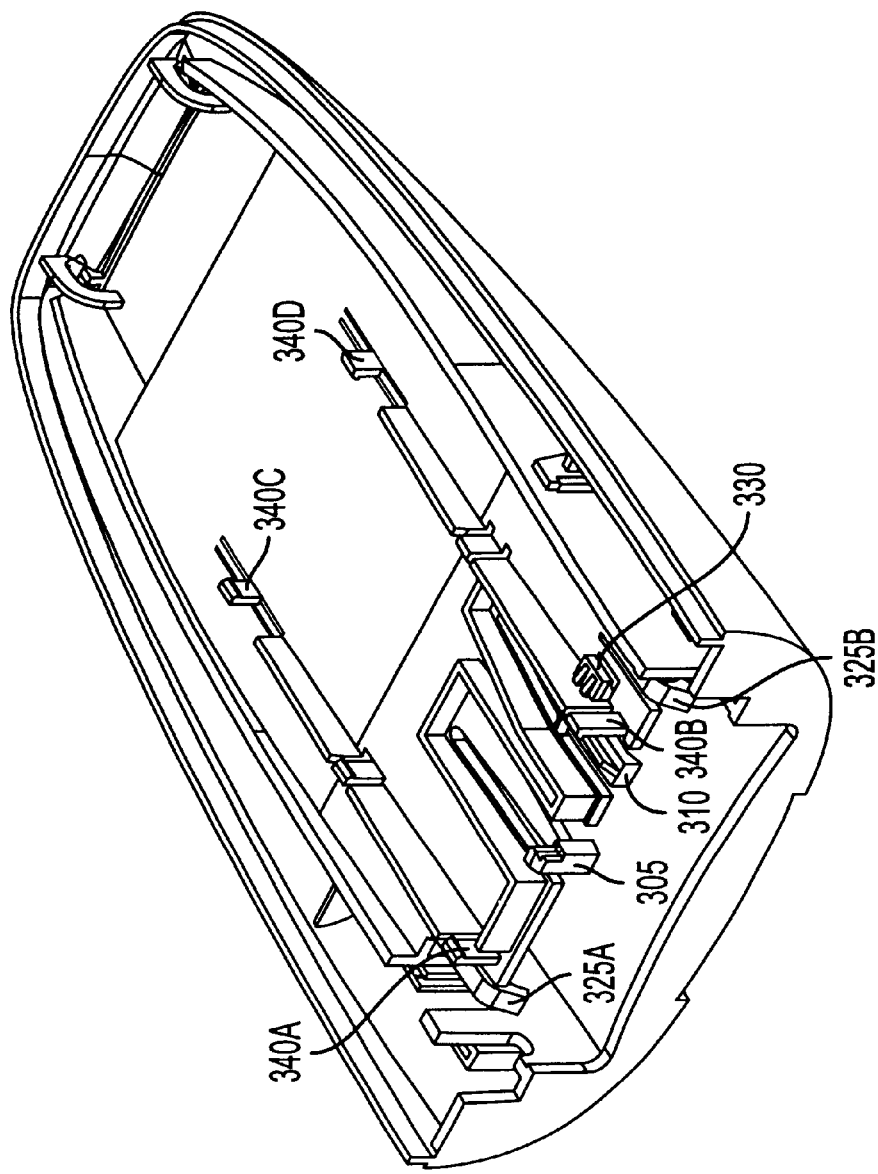

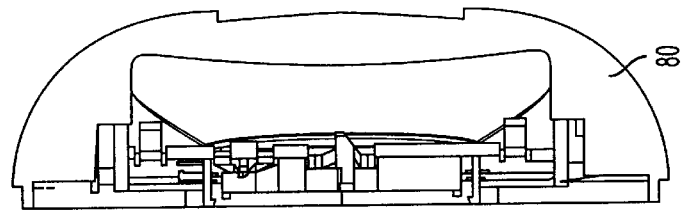
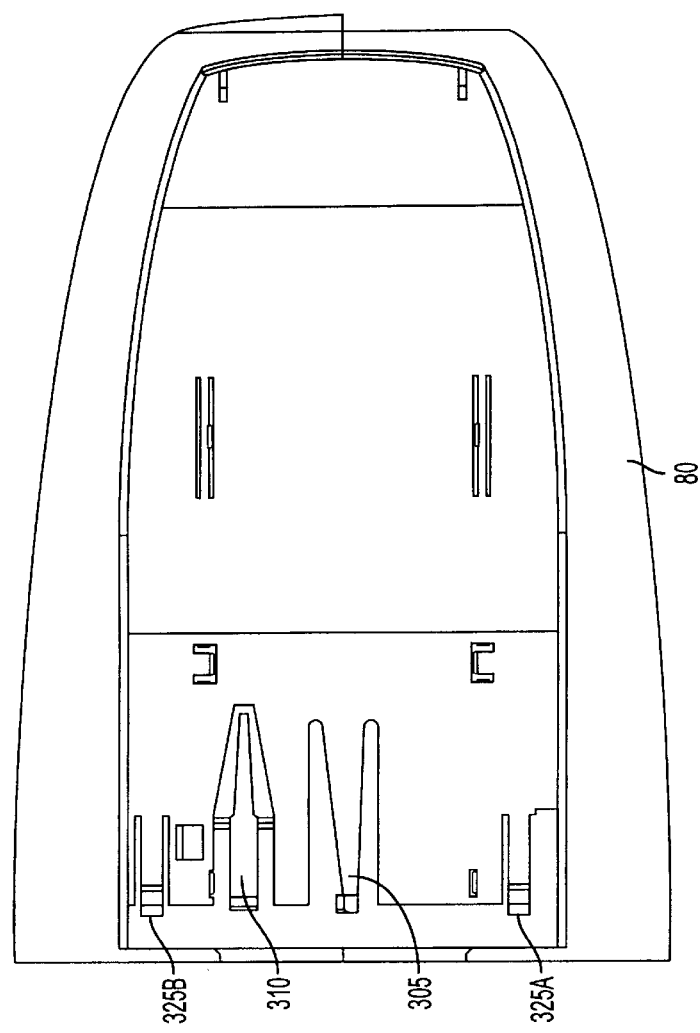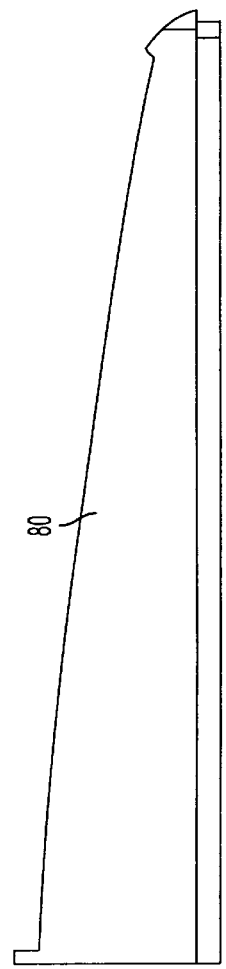

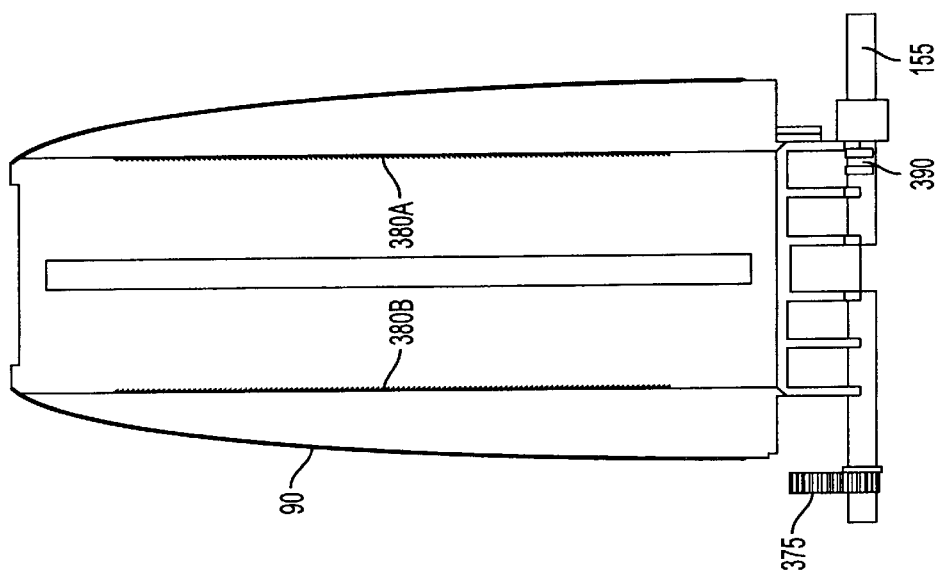
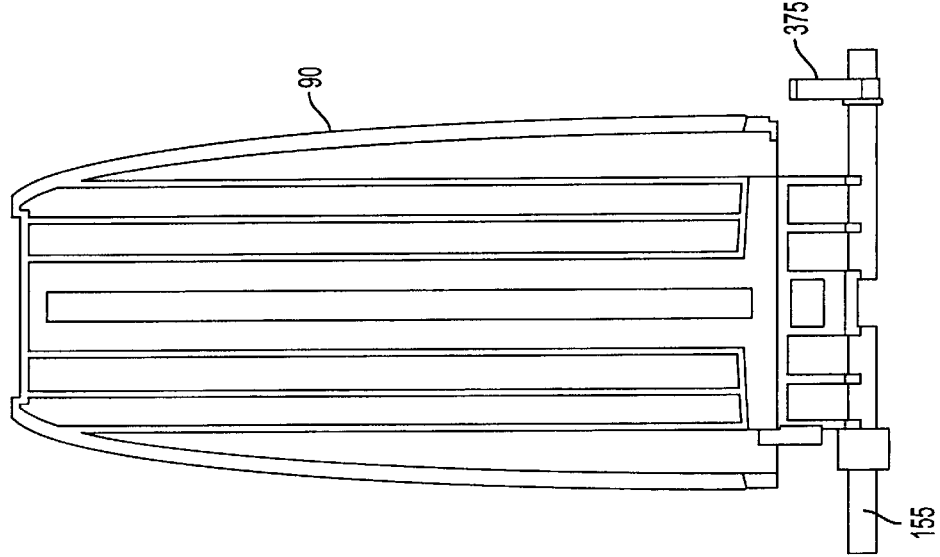

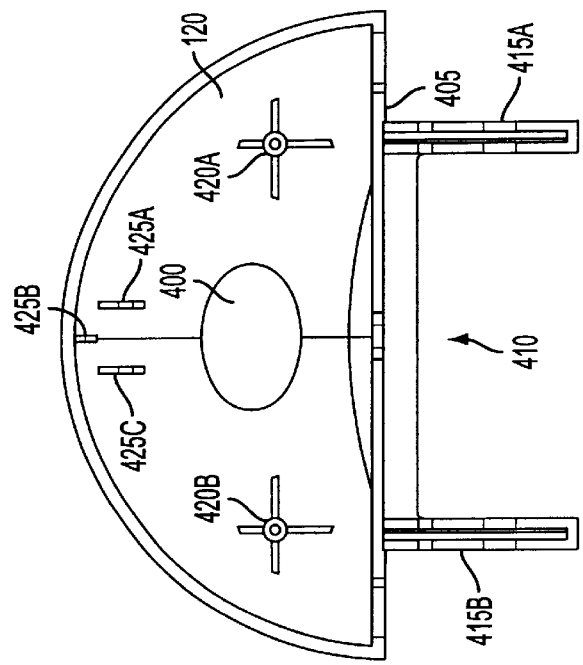
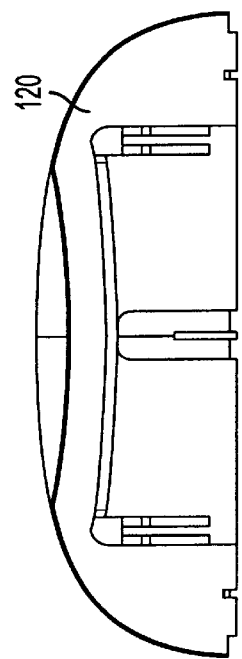
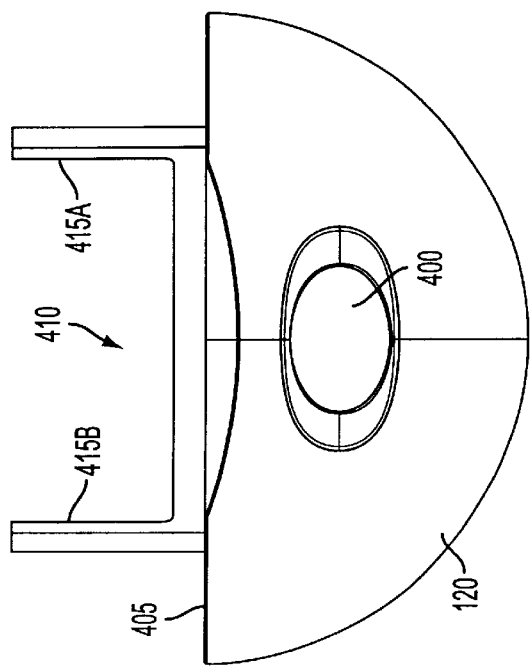
FIG. 10A
FIG. 10B
FIG. 10C
FIG. 10D

PORTABLE COMPUTER PEDESTAL METHOD AND APPARATUS

TECHNICAL FIELD OF THE INVENTION

The present invention relates generally to a pedestal and more particularly to a portable pedestal for providing structural support to portable devices including portable computers such as a laptop or notebook computer.

BACKGROUND OF THE INVENTION

Prior art pedestals for portable computers, sometimes called stands, bases, or docking stations, are known to those skilled in the art. For example, a conventional docking station is typically used for holding a portable computer such as a laptop or notebook computer. As most portable computers comprise a movable display screen, when docked, it is desirable that the display screen may be suitably oriented or positioned for proper viewing by one or more users.

A problem with this technology has been that viewing of a display screen of a portable computer by multiple users can be difficult. For example, in a group presentation with a laptop computer placed on a table, it is extremely difficult for a group of individuals to view the display screen as it can only be typically positioned in a restricted fashion that limits viewing range and/or fails to provide an ergonomic viewing position as well. Therefore, what is required is a solution that facilitates simultaneous viewing of the display screen by a group of individuals.

Another problem with this technology has been that even during a single user session, the display screen could only be positioned at such height that a single user has to look down, thereby pulling the neck and shoulders to lean forward into an uncomfortable hunched position. Therefore, what is also required is a solution that provides for ergonomic viewing positions of the display screen to a user.

One unsatisfactory approach, in an attempt to solve the above-discussed problems typically involves using a large and bulky stand or base for a portable computer to sit upon. However, a disadvantage of this approach is that a relatively large and/or bulky stand or base could be a cumbersome peripheral to carry around. Further, a large and/or bulky stand or base may be aesthetically unattractive. Therefore, what is also needed is a solution that meets the above-discussed requirements in a more effective manner.

Heretofore, the requirements of providing more effective viewability of a display screen of a portable computer without compromising portability and/or aesthetics referred to above have not been fully met. What is needed is a solution that simultaneously addresses all of these requirements.

SUMMARY OF THE INVENTION

The present invention generally provides an apparatus and method for providing ergonomic viewing positions to a variety of portable devices including a portable computer. In one exemplary embodiment, a support apparatus may include a base having a recess formed to receive a portable device, an anchor movably coupled to the base, and a support pivotally coupled to the base. The portable device may include a desktop portion and a display portion. The anchor may be formed to engage the portable device when the desktop portion of the portable device is disposed in the recess of the base. The support may extend upwardly from the base for holding the display portion of the portable device. According to one aspect of invention, the apparatus and method provide advantages in that viewability of a laptop computer can be readily extended by ergonomically orienting the laptop computer through the use of a portable pedestal.

In another exemplary embodiment, a pedestal may include a base having a housing formed to receive a portable computer and a support. The support may be movably coupled to the base to releasably engage the portable computer at an ergonomic viewing position responsive to the placement of the portable computer in the housing of the base.

In yet another exemplary embodiment, a portable computer pedestal is provided for selectively orienting a portable computer having a desktop portion and a display screen in an ergonomic viewing position. According to one aspect of the invention, the portable computer pedestal includes a pedestal base having a housing formed to receive the portable computer and a support having a mounting portion. The support may be movably coupled to the pedestal base for releasably engaging the portable computer responsive to the placement of the desktop portion in the housing of the pedestal base. The desktop portion could be disposed adjacent to the mounting portion in a secure relationship therewith.

According to another aspect of the invention, a support apparatus may include a first portion and a second portion operably coupled to the first portion for providing vertical support thereon. Furthermore, a third portion may be movably coupled to the first portion. The third portion may be formed to provide a housing between the first and third portions. In addition, a fourth portion may be fixedly coupled to the third portion and movably coupled to the first portion. The fourth portion may be formed to provide the housing responsive to an activation.

According to a yet another aspect of the invention, a portable computer pedestal for ergonomic viewing may include a front bezel and a back bezel operably coupled to the front bezel. The back bezel may be formed to provide a housing to receive an object having a distal end and removably clamping the distal end of the object therein substantially against the front bezel. The portable computer pedestal may further include an easel operably coupled to the back bezel for providing vertical support thereon to the object. Further, a retractable pedestal bottom may be fixedly coupled to the front bezel and movably coupled to the back bezel. The retractable pedestal bottom and the front bezel may be formed to selectively move the back bezel either in a first direction to release the back bezel from the front bezel for providing the housing or in a second direction to engage the back bezel with the front bezel for holding the object therebetween.

According to a yet further aspect of the invention, a portable pedestal includes a base to receive a display device, and a support pivotally coupled to the base for releasably engaging the display device in an ergonomic orientation such that the display device is disposed in an upright vertical position providing an improved viewing range suitable for a plurality of viewers.

According to a further aspect of the invention, a method generally includes (a) providing a base having a recess formed to receive a portable device having a desktop portion and a display portion; (b) providing an anchor for engaging the desktop portion in the recess of the base; (c) providing a support for holding the display portion of the portable device; and (d) interposing the desktop portion in the recess for ergonomically positioning the portable device.

According to yet a further aspect of the invention, a method for orienting a portable computer having a desktop portion and a display screen in an ergonomic viewing position is provided. The method generally includes (a) providing a pedestal base having a housing formed to receive the desktop portion of the portable computer; (b) providing an anchor for releasably engaging the desktop portion in the housing of the pedestal base; (c) providing a support for releasably holding the display screen of the portable computer; and (d) causing the display screen of the portable computer to be disposed at the ergonomic viewing position in response to placement of the desktop portion in the housing while the display screen being supported by the support.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which:

FIG. 1 is a perspective view of an exemplary embodiment of a portable computer pedestal being retracted for receiving a portion of a portable computer in accordance with one aspect of the invention.

FIG. 2A is a front-end perspective view of the exemplary embodiment for the portable computer pedestal of FIG. 1 with the support in a fully extended position to accommodate a portable computer in a vertical orientation according to one aspect of the invention.

FIG. 2B is a backend perspective view of the exemplary embodiment for the portable computer pedestal of FIG. 1 with the support in a fully extended position to accommodate a portable computer in a vertical orientation according to one aspect of the invention.

FIG. 3 is a partially cut away perspective view of FIG. 1 from the front side with the door removed to show exemplary details in accordance with one aspect of the invention.

FIG. 4 is a partially cut away perspective view of FIG. 1 from the backside with the door removed to show exemplary details in accordance with one aspect of the invention.

FIG. 6A is a top perspective view of the back bezel of FIG. 1 depicting exemplary details in accordance with one aspect of the invention.

FIG. 6B is a bottom perspective view of the back bezel of FIG. 1 depicting exemplary details in accordance with one aspect of the invention.

FIG. 7A is a top elevational view of the back bezel of FIG. 1 with the easel and door removed to show representative details according to one aspect of the invention.

FIG. 7B is a left side edge elevational view of the back bezel of FIG. 7A.

FIG. 7C is another side edge elevational view of the back bezel of FIG. 7A.

FIG. 9A is a top elevational view of the easel of FIG. 1 depicting exemplary details consistent with one aspect of the invention.

FIG. 9B is a bottom elevational view of the easel of FIG. 9A showing representative details according to one aspect of the invention.

FIG. 9C is a side edge elevational view of the easel of FIG. 9B.

FIG. 10A is a top elevational view of the front bezel of FIG. 1 illustrating exemplary details in accordance with one aspect of the invention.

FIG. 10B is a side edge elevational view of the front bezel of FIG. 10A.

FIG. 10C is a bottom elevational view of the front bezel of FIG. 10A depicting representative details consistent with one aspect of the invention.

FIG. 10D is another side edge elevational view of the front bezel of FIG. 10A.

DETAILED DESCRIPTION

Figures 5A, 5B:
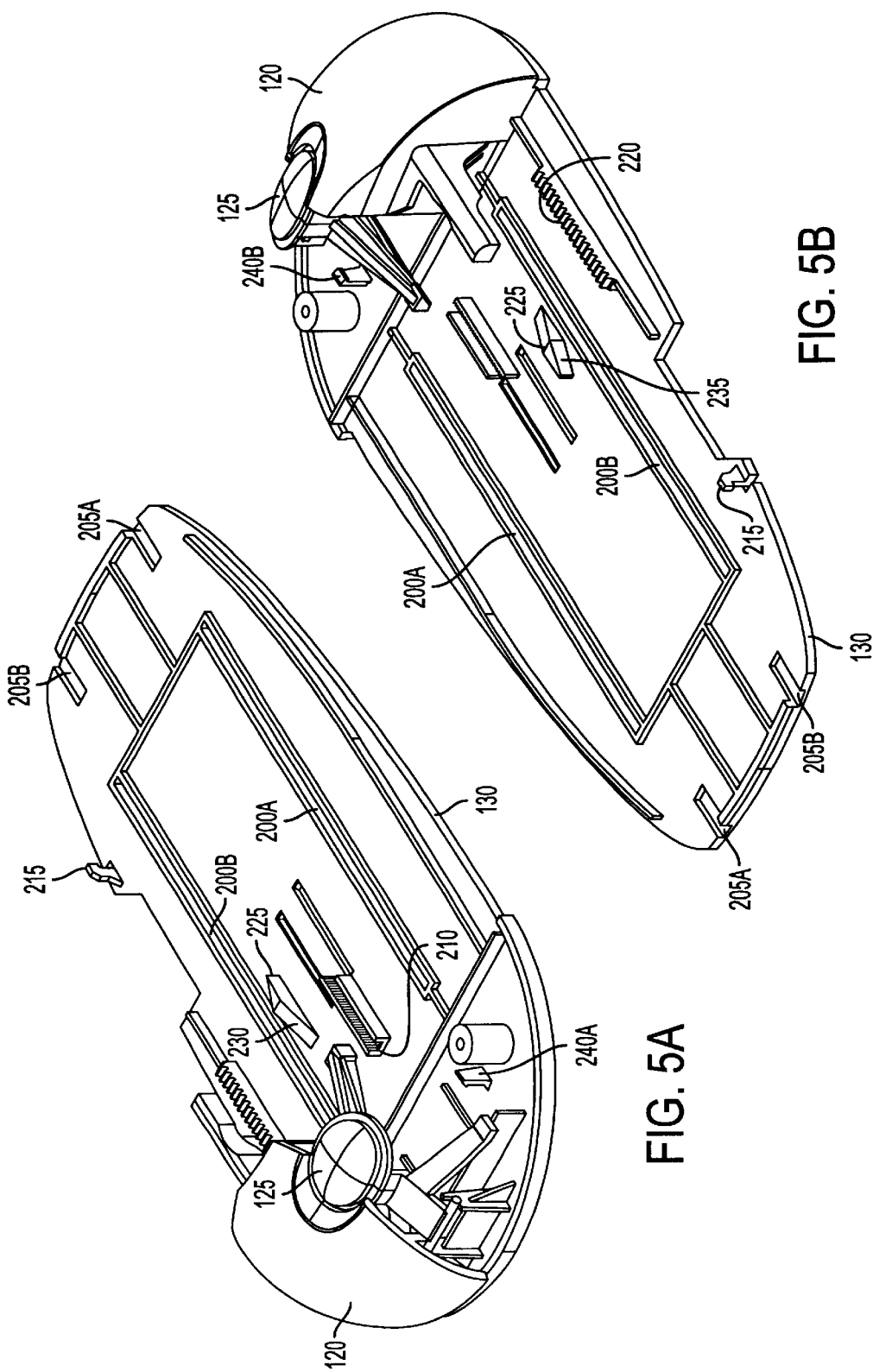
FIG. 5A is a partially cut away front-end perspective view of FIG. 1 from front side with the retractable pedestal bottom exposed to illustrate exemplary details in accordance with one aspect of the invention.
FIG. 5B is a partially cut away front-end perspective view of FIG. 1 from backside with the retractable pedestal bottom exposed to illustrate exemplary details in accordance with one aspect of the invention.

The invention relates generally to a pedestal and more particularly to a portable pedestal for providing ergonomic support to a portable device including, but is not limited to a portable computer such as a laptop or notebook computer generally comprising a display screen and a desktop base. Specifically, the invention contemplates positioning a portable computer in an ergonomic viewing position such as a fully opened state having the display screen of the portable computer oriented in a plane substantially parallel to the desktop base of the portable computer. Thus, according to one aspect of the invention, the portable computer may be ergonomically oriented in a substantially upright and/or vertical position to facilitate relatively improved viewability by a single user and/or a group of individuals. The invention should, however, not necessarily be restricted to the field of these applications, geometric features or materials as will be readily evident. The use of the same reference numerals in different drawings indicates similar or identical terms.

FIG. 1 is a perspective view of an exemplary embodiment of a portable computer pedestal 50 being retracted for receiving a portion of a portable device such as a portable computer (not shown) in accordance with one aspect of the invention. The portable computer pedestal 50 may comprise a base 60 having a housing 65 formed for receiving the portion of the portable computer, an anchor 70 movably coupled to the base 60, and a support 75 operably coupled to the base 60.

As persons skilled in the art will appreciate that typical portable computers generally include a desktop computer base and a foldable display screen. Accordingly, the portable computer may include a desktop portion and a display portion. The anchor 70 may be formed for engaging the portable computer when the desktop portion of the portable device is disposed in the housing 65 of the base 60. The support 75 may be operably coupled to the base 60 and extend upwardly therefrom for holding the display portion of the portable computer. For example, the support 75 may be pivotally coupled to the base 60.

In one exemplary embodiment, the base 60 may comprise a back bezel 80 having a door 85 operatively coupled thereto. For example, the door 85 may be selectively and/or automatically opened and closed to provide the support 75. The support 75 may include an easel 90, an easel extension 100 to extend the easel 90 upwardly from the base 60, and an easel latch 105 to fixedly hold the easel extension 100 at a desired position. The easel 90 may be operably coupled to the back bezel 80 for providing vertical support thereon to the portable computer.

The anchor 70 may include a front bezel 120 operably coupled to the back bezel 80. The front bezel 120 could be formed for providing the housing 65 to receive the portable computer therein. For example, the desktop portion of the portable computer may be removably clamped in the housing 65 against the back bezel 80. In particular, the desktop portion having generally a distal end may be securely disposed within the housing 65.

The base 60 may include a retractable pedestal bottom 130 movably coupled to the back bezel 80 and fixedly coupled to the front bezel 120. The retractable pedestal bottom 130 in conjunction with the front bezel 120 may be formed for permitting a selective lateral movement of the back bezel 80. Such selective lateral movement could be either in a first direction to release the back bezel 80 from the front bezel 120. Thus, in turn providing the housing 65. Alternatively, the selective lateral movement could be in a second direction for engaging the front bezel 120 with the back bezel 80 in a manner to securely hold the portable computer therebetween.

In operation, to releasably engage the desktop portion within the housing 65 of the base 60, in a secure relationship therewith, a locking mechanism may be provided through the anchor 70. Similarly, a latching mechanism may be included for the support 75 to releasably hold the display portion in a secure relationship therewith. Furthermore, for automatically operating the anchor 70, in a horizontal plane, to receive one end of the desktop portion of the portable computer within the housing 65, an activation mechanism could be readily devised. For example, the activation mechanism may include a button 125. The activation mechanism may further comprise an ejector mechanism for causing the support 75 to automatically move in a predetermined position. The predetermined position of the support 75 facilitates clamping of the display portion of the portable computer thereto. For disengaging the anchor 70 from the base 60 to decouple the distal end of the desktop portion of the portable computer, a release mechanism may be provided which could include a lever (not shown).

In one exemplary embodiment, for the present exposition, representative details for a variety of the above referenced mechanisms are generally described herein with reference to following drawings. Persons skilled in the art will recognize that these, and other, aspects of the invention will be better appreciated and understood when considered in conjunction with the following description and the accompanying drawings. It should be understood, however, that the following description, while indicating exemplary embodiments of the invention and numerous specific details thereof, is given by way of illustration and not of limitation. Many changes and modifications may be made within the scope of the invention without departing from the spirit thereof, and the invention includes all such modifications.

FIG. 2A is, as viewed in the drawing figure, a front-end perspective view of the exemplary embodiment for the portable computer pedestal 50 of FIG. 1 with the support 75 in a fully extended position to accommodate a portable computer (not shown) in a vertical orientation according to one aspect of the invention. FIG. 2B is, as viewed in the drawing figure, a backend perspective view of the exemplary embodiment for the portable computer pedestal 50 of FIG. 2A. Referring now to FIGS. 2A and 2B, the easel extension 100 generally extends the easel 90 for securely positioning the display portion of the portable computer at such a height that allows relatively easy viewing for either an individual user or a group of two or more individuals while the portable computer may be supported in a vertical orientation within the housing 65. For instance, the easel extension 100 may be extended upwardly using a torsion spring 150 of appropriate spring strength while the door 85 is substantially closed.

FIG. 3 is, as viewed in the drawing figure, a partially cut away perspective view of FIG. 1 from the frontside with the door 85 removed to show exemplary details in accordance with one aspect of the invention. Likewise, FIG. 4 is, as viewed in the drawing figure, a partially cut away perspective view of FIG. 1 from the backside with the door 85 removed to show exemplary details in accordance with one aspect of the invention. With reference to FIGS. 3 and 4, the torsion spring 150 may include at least two extended legs for appropriate deployment thereof. For example, with suitably located catches devised for holding the two extended legs, the torsion spring 150 may be deployed. It is to be understood that the torsion spring 150 could be readily mounted on an easel pivot rod 155 of the easel 90. As an example, the torsion spring 150 of approximate spring strength of 6 to 8 pounds/inch (lb./in) may be advantageously deployed. The back bezel 80 may comprise longitudinal ribs 160A and 160B (not shown) for coupling to the retractable pedestal bottom 130. The retractable pedestal bottom 130 may comprise fastener-receiving towers 170A and 170B for coupling the front bezel 120 thereto. The retractable pedestal bottom 130 may further comprise support posts 180A and 180B for operably mounting the button 125 thereon.

FIG. 5A is, as viewed in the drawing figure, a partially cut away front-end perspective view of FIG. 1 from front side with the retractable pedestal bottom 130 exposed to illustrate exemplary details in accordance with one aspect of the invention. Likewise, FIG. 5B is, as viewed in the drawing figure, a partially cut away front-end perspective view of FIG. 1 from backside. Referring to FIGS. 5A and 5B, the retractable pedestal bottom 130 may encompass base grooves 200A and 200B for movably receiving the respective longitudinal ribs 160A and 160B. For instance, each of the longitudinal ribs 160A and 160B may include one or more teeth at respective distal ends for snapping in the associated base grooves 200A and 200B. Furthermore, the retractable pedestal bottom 130 may include base snap ports 205A and 205B for securely coupling to the back bezel 80. In addition, the retractable pedestal bottom 130 may include a ratchet mechanism including a track 210 having one or more inclined teeth into which a lever (not shown) having one or more teeth disposed on a distal end may traverse to allow effective motion in one direction only.

For a damped operation of the back bezel 80, a base snap post 215 and an associated damper track 220 may be employed to provide a spring loaded lever (not shown) to traverse along the damper track 220. More specifically, the torsion spring 150 either may be in a stretched state when the back bezel 80 is closed or in a compressed state when the back bezel 80 is opened to form the housing 65. The retractable pedestal bottom 130 may further include an erected structure 225 having a ramp 230 generally formed on the top and a bump 235 which is advantageously formed on a side. In one embodiment, weight snaps 240A and 240B may be attached to the retractable pedestal bottom 130 for providing significantly improved center of gravity and stability to the portable computer pedestal 50.

In operation, while locking and/or unlocking the back bezel 80, a desired motion may be imparted thereto. Accordingly, while setting-up or unlocking, first the door 85 is released by having a lever (not shown) ride up the bump 235. On the door 85 closing, the lever moves on the track 210 for locking. As an example, button 135 may be pressed to activate unlocking of the back bezel 80. Conversely, the lever may be activated to lock the back bezel 80. Those skilled in the art, however, will recognize that the invention contemplates embodiments that provide locking and/or unlocking with other mechanisms.

FIG. 6A is, as viewed in the drawing figure, a top perspective view of the back bezel 80 of FIG. 1 depicting exemplary details in accordance with one aspect of the invention. FIG. 6B is, as viewed in the drawing figure, a bottom perspective view of the back bezel 80 of FIG. 1 depicting exemplary details in accordance with one aspect of the invention. With reference to FIG. 6A, the back bezel 80 houses the easel 90 (not shown). To engage the door 85 (not shown), the back bezel 80 generally includes door hinge hooks 300A and 300B which may be provided generally at a distal end thereof. However, it is to be understood the other forms of coupling may be readily employed for the door 85. For the easel 90 operation, back bezel 80 may comprise an activation tab 305 and an easel release 310.

Referring to FIG. 6B, the back bezel 80 may further include easel retention snaps 325A and 325B. A spring retainer 330 may also be provided to enable a controlled operation of the easel 90. The activation tab 305 may be advantageously contemplated as a ratchet having a set of teeth formed thereon. The easel release 310 could be advantageously devised as a seesaw to pivot at a point for selectively releasing the easel 90 in response to an activation generally governing the release thereof. The back bezel 80 may further include a set of rib snap posts 340A through 340D for movably coupling to the retractable pedestal bottom 130 (not shown). Specifically, by snapping the set of rib snap posts 340A through 340D within respective base grooves 200A and 200B (not shown), the back bezel 80 can be operably coupled to the retractable pedestal bottom 130.

FIG. 7A is, as viewed in the drawing figure, a top elevational view of the back bezel 80 of FIG. 1 with the easel 90 and door 85 removed. FIG. 7B is, as viewed in the drawing figure, a side edge elevational view of the back bezel 80 of FIG. 7A. Similarly, FIG. 7C is, as viewed in the drawing figure, another side edge elevational view of the back bezel 80 of FIG. 7A. With reference to FIGS. 7A, 7B and 7C, representative details of the back bezel 80 are depicted according to one aspect of the invention. However, as those skilled in the art will appreciate that numerous shapes, forms, and mechanisms could be readily devised for the back bezel 80 without digressing from the scope and spirit of the invention.

Figure 8A:
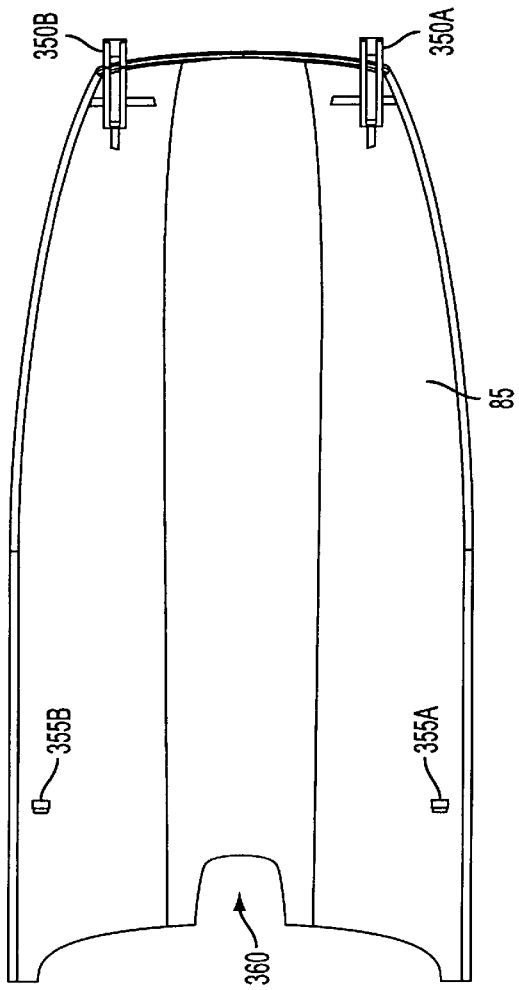
FIG. 8A is a bottom elevational view of the door of FIG. 1 illustrating exemplary details in accordance with one aspect of the invention.
Figure 8C:
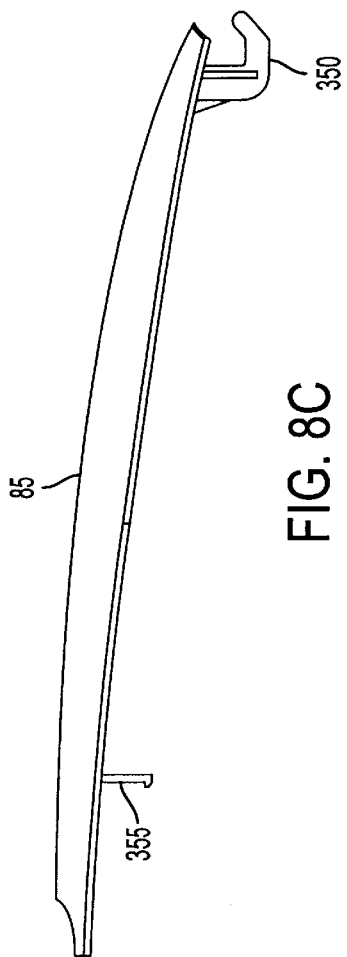
FIG. 8C is another side edge elevational view of the door of FIG. 8A.
Figure 8B:
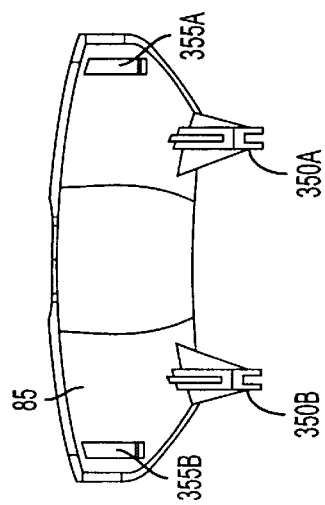
FIG. 8B is a left side edge elevational view of the door of FIG. 8A.

FIG. 8A is, as viewed in the drawing figure, a bottom elevational view of the door 85 of FIG. 1. FIG. 8B is, as viewed in the drawing figure, a side edge elevational view of the door 85 of FIG. 8A. Likewise, FIG. 8C is, as viewed in the drawing figure, another side edge elevational view of the door 85 of FIG. 8A. As shown in FIGS. 8A, 8B, and 8C, exemplary details of the door 85 are illustrated in accordance with one aspect of the invention. For pivotally coupling the door 85 to the back bezel 80 (not shown), the door 85 may include door hinges 350A and 350B generally located on the interior side at a distal end thereof. The door hinges 350A and 350B could be readily snapped to the appropriately aligned door hinge hooks 300A and 300B (not shown). At the other opposite distal end, the door 85 may further include a finger slot 360, which permits lifting and/or closing of the door 85. To securely close the door 85, a pair of closure rib snaps 355A and 355B may be suitably disposed on the interior side thereof.

FIGS. 9A, 9B, and 9C depict, as viewed in the drawing figures, top, bottom, and side edge elevational views of the easel 90 of FIG. 1, respectively, showing representative details consistent with one aspect of the invention. Referring to FIGS. 9A, 9B, and 9C, the easel 90 may include a gear piece 375, easel tracks 380A and 380B. The gear piece 375, at one end of the easel pivot 155, generally permits rotary damping while tracking on the damper track 220 (not shown) when the easel 90 is being either vertically oriented or laterally housed. The easel tracks 380A and 380B enable selective movement of the easel latch 105 (not shown) thereon for extending the support 75 (not shown) upwardly, if desired. The easel 90 may further include an easel catch 390 to receive one of the legs of the torsion spring 150 therein.

FIGS. 10A, 10B, 10C and 10D show exemplary details, as viewed in the drawing figures, in top, side edge, bottom, and another side edge elevational views of the front bezel 120 of FIG. 1, respectively. In accordance with one aspect of the invention, as illustrated in FIGS. 10A, 10B, 10C, and 10D, the front bezel 120 of FIG. 1 may receive the button 125 (not shown) within the interior of a button housing 400. Additionally, on a mating end 405, the front bezel 120 may further include a hollow guide structure 410 having, as viewed in the drawing figures, a pair of tapered projections 415A and 415B. The pair of tapered projections 415A and 415B may be outwardly oriented proximal to left and right sides on the mating end 405 of the front bezel 120. The pair of tapered projections 415A and 415B may be respectively aligned with undersides of the back bezel 80.

As depicted in FIG. 10C, formed on the underside of the front bezel 120, are a pair of projected orifices 420A and 420B, and a set of hinges 425A through 425C. Each projected orifice 420 may comprise threads formed therein to receive screws or fasteners for fixedly latching the front bezel 120 onto the retractable pedestal bottom 130 (not shown). The set of hinges 425A through 425C may receive the support post 180A (not shown) for operably mounting the button 125 thereon.

In operation, the hollow guide structure 410 permits the pair of tapered projections 415A and 415B to slide in or out along the respective undersides of the back bezel 80 responsive to an activation such as a user pressing the button 125. As contemplated in one embodiment, the back bezel 80 laterally traverses away from the front bezel 120 to provide the housing 65 (not shown) therebetween. Conversely, releasing a lever (not shown) could reverse the travel of the back bezel 80 to either securely clamp onto an object inserted within the housing 65 or permit travelling thereof towards the front bezel 120 for positioning substantially against thereto.

Figure 11C:
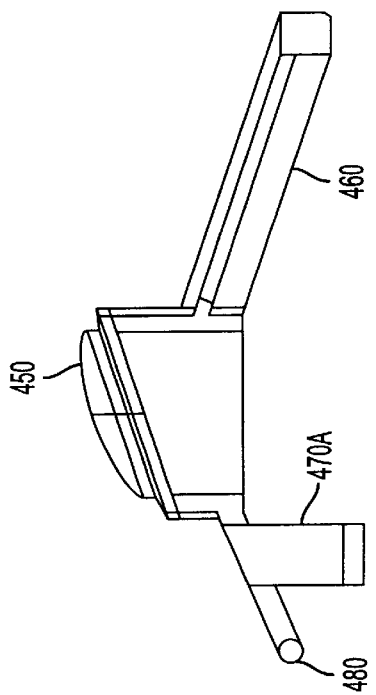
FIG. 11C is another side edge elevational view of the button of FIG. 11A.
Figure 11D:
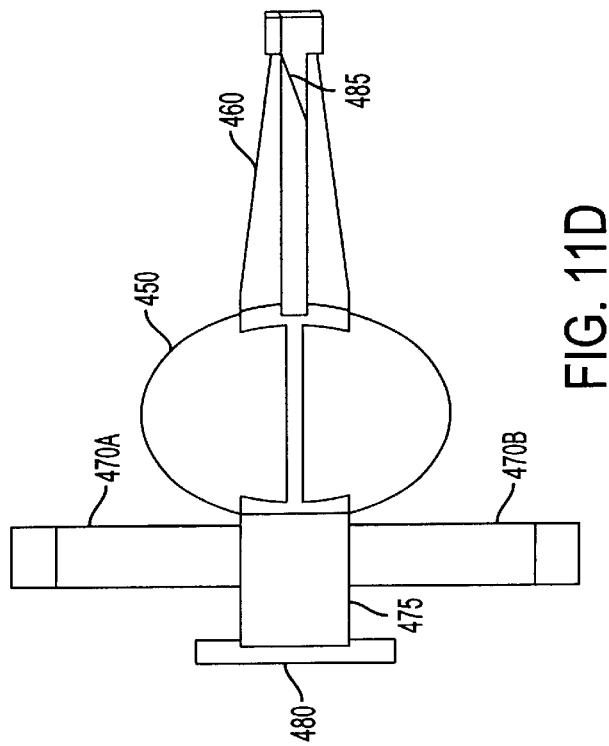
FIG. 11D is a bottom elevational view of the button of FIG. 11A.
Figure 11A:
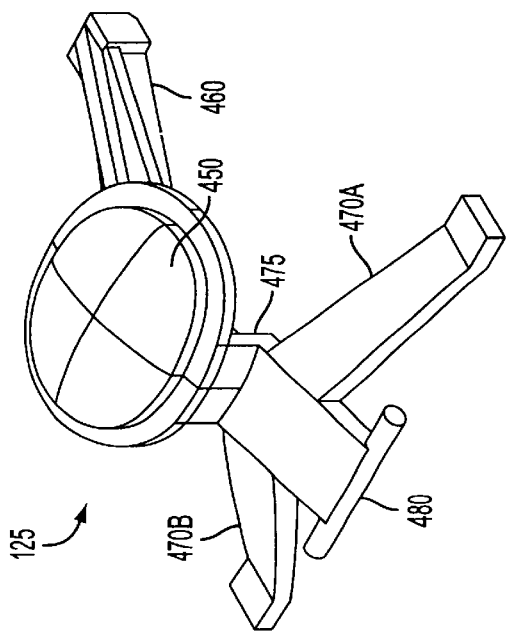
FIG. 11A is a perspective view of the button of FIG. 1 illustrating exemplary details in accordance with one aspect of the invention.
Figure 11B:
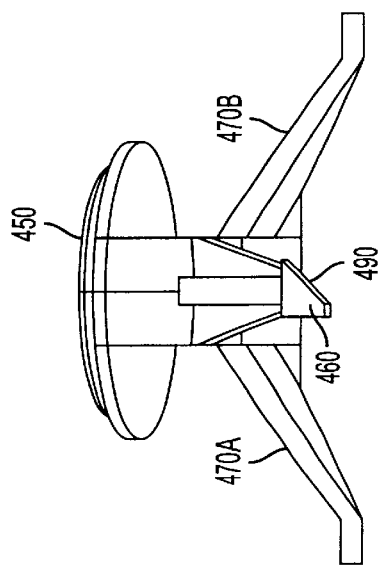
FIG. 11B is a side edge elevational view of the button of FIG. 11A.

FIGS. 11A through 11D relate to the button 125 of FIG. 2A illustrating exemplary details in accordance with one aspect of the invention. In particular, FIG. 11A is a perspective view of the button 125. FIG. 11B is, as viewed in the drawing figure, a side edge elevational view of the button of FIG. 11A. Likewise, FIG. 11C is, as viewed in the drawing figure, another side edge elevational view of the button of FIG. 11A. FIG. 11D is, as viewed in the drawing figure, a bottom elevational view of the button of FIG. 11A.

With reference to FIGS. 11A through 11D, the button 125 may comprise a button head 450 connected to a retractable tab 460. The button 125 may further include a pair of return springs 470A and 470B, which may be oppositely extended from a joint 475. Connected at the joint 475 may be a pivot pin 480. The pivot pin 480 could be operably disposed at the support post 180A (not shown). Additionally, formed at a distal end of the longitudinal peripheral surface of the retractable tab 460, an activation wedge 485 having a ramp 490. Alternatively, a torsion spring may be deployed operative in a manner to facilitate the operation of the button 125. The retractable tab 460 could movably interact with the back bezel 80 for either releasing the easel 90 and/or moving the back bezel 80, the front bezel 120, and/or both the front and back bezels 80, 120 to form the housing 65. Accordingly, it is to be understood that, when appropriately activated, the button 125 could employ any suitable spring-loaded design for sliding in and/or out from the button housing 400 (not shown).

In operation, the pair of return springs 470A and 470B in conjunction with the pivot pin 480 may permit an activation for the button 125 responsive to a user action including, but is not limited to appropriately pressing the button head 450. As a result, the button 125 may enable the retractable tab 460 to initialize a coordinated and/or automatic operation of the portable computer pedestal 50 of FIG. 1.

Figure 12B:
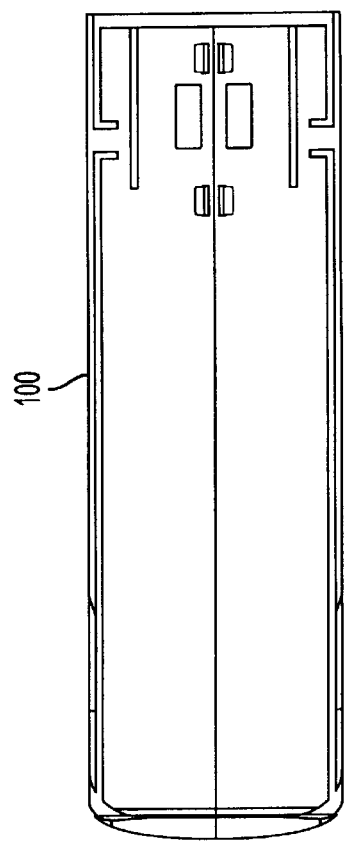
FIG. 12B is a bottom elevational view of the easel extension of FIG. 12A.
Figure 12D:
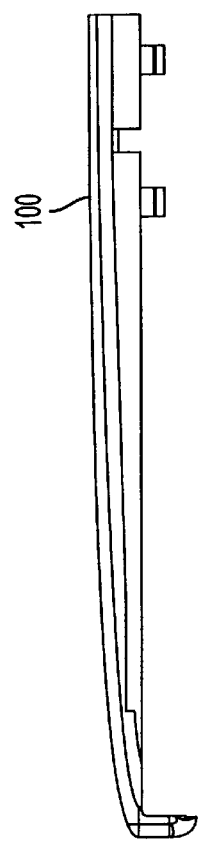
FIG. 12D is another side edge elevational view of the easel extension of FIG. 12B.
Figure 12A:
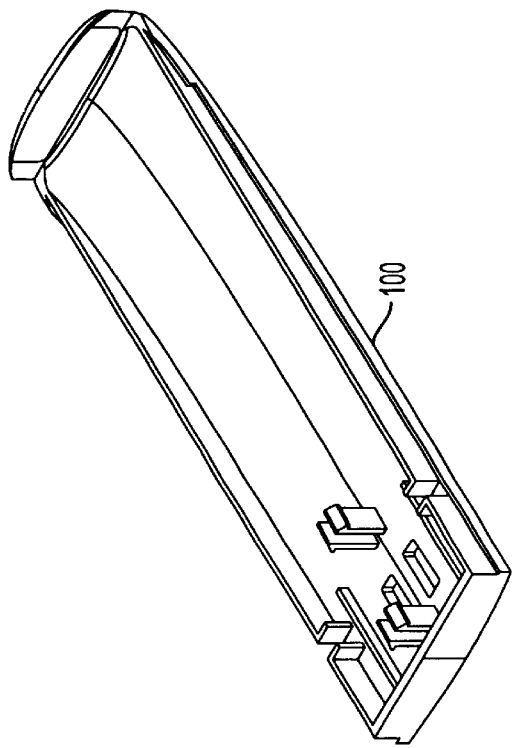
FIG. 12A is a bottom perspective view of the easel extension of FIG. 1 depicting representative details according to one aspect of the invention.
Figure 12C:
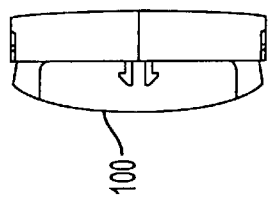
FIG. 12C is a right side edge elevational view of the easel extension of FIG. 12B.

FIGS. 12A through 12D relate to the easel extension 100 of FIG. 1 depicting representative details according to one aspect of the invention. Specifically, FIG. 12A is a bottom perspective view of the easel extension 100. FIG. 12B is, as shown in the drawing figure, a bottom elevational view of the easel extension 100 of FIG. 12A. FIG. 12C is, as shown in the drawing figure, a side edge elevational view of the easel extension 100 of FIG. 12B. FIG. 12D is, as shown in the drawing figure, another side edge elevational view of the easel extension 100 of FIG. 12B. Referring to FIGS. 12A through 12D, the easel extension 100 may comprise a set of snap pins 475A through 475D for movably mounting onto the easel 90 (not shown). Thus, the height of the support 75 (not shown) may be selectively adjusted by sliding the easel extension 100 over the easel 90. To this end, in one embodiment, recesses 480A, 480B and associated channels 485A, 485B may be suitably configured within the easel extension 100.

Figure 13:
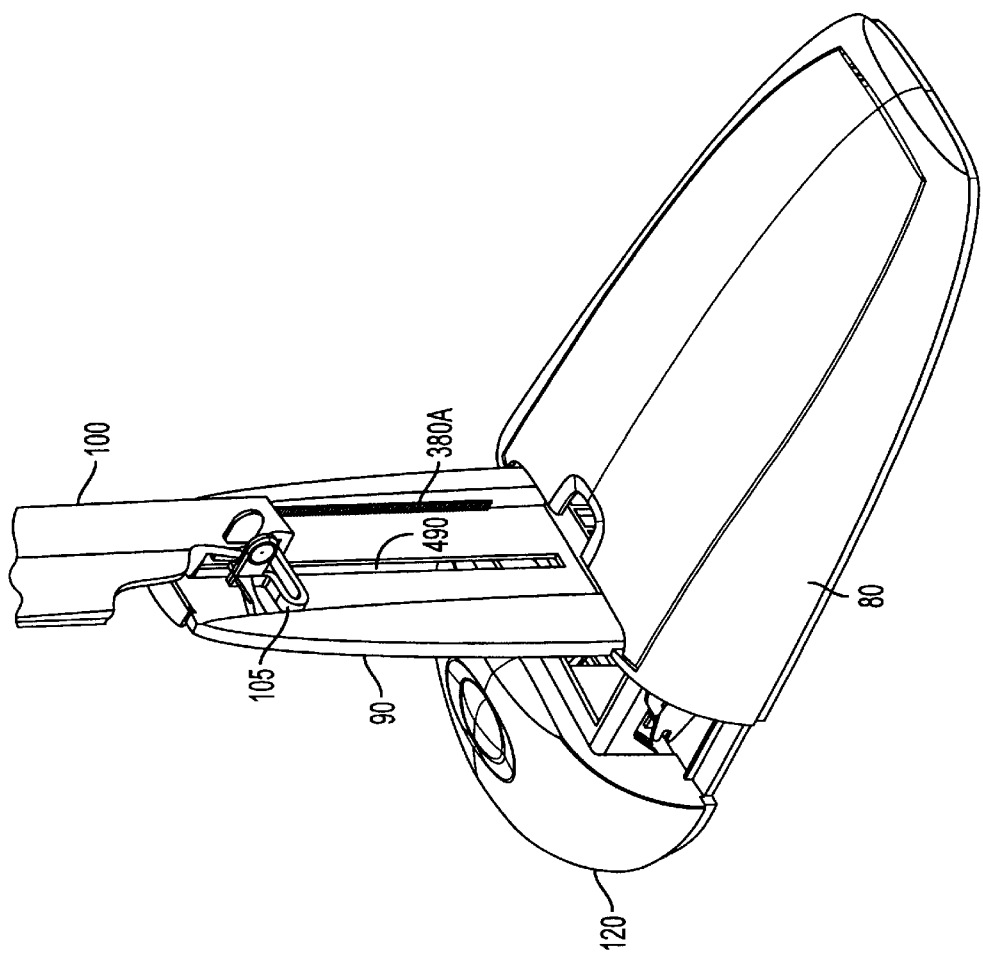
FIG. 13 is a sectional perspective view of the exemplary embodiment for the portable computer pedestal of FIG. 1 illustrating the easel in an extended orientation with the easel latch being operative to deploy the easel extension according to one aspect of the invention.

Referring to FIG. 13, a sectional perspective view of the portable computer pedestal 50 of FIG. 1 generally illustrates an extended orientation for the support 75 according to one aspect of the invention. More specifically, the extended orientation contemplates that the easel latch 105 operatively deploys the easel extension 100 in an extended position relative to the easel 90. For example, the easel latch 105 may be shifted along an easel groove 490 while riding over the easel tracks 380A and 380B (not shown) either upwardly or downwardly to arrive at a specific height that may be desired.

Figure 14B:
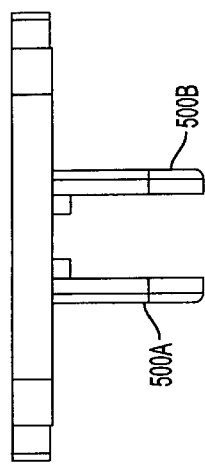
FIG. 14B is a top side edge elevational view of the easel latch of FIG. 14A.
Figure 14D:
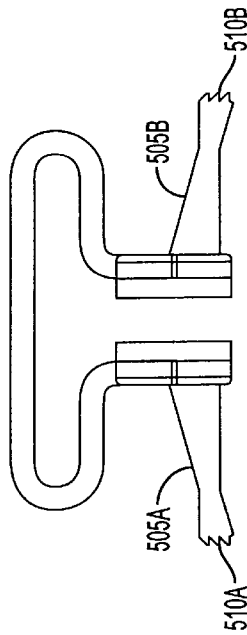
FIG. 14D is a front side edge elevational view of the easel latch of FIG. 14A.
Figure 14A:
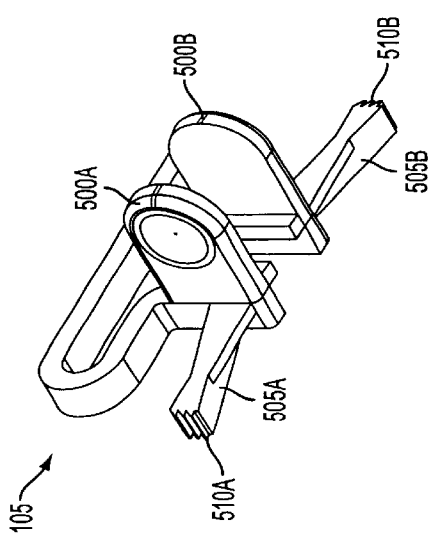
FIG. 14A is a perspective view of the easel latch of FIG. 1 showing exemplary details according to one aspect of the invention.
Figure 14C:
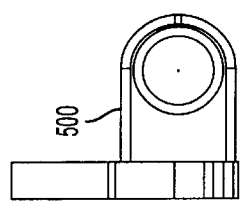
FIG. 14C is a left side edge elevational view of the easel latch of FIG. 14A.

FIGS. 14A through 14D relate to the easel latch 105 of FIG. 1 showing exemplary details according to one aspect of the invention. In particular, FIG. 14A is a perspective view of the easel latch 105 of FIG. 1. FIG. 14B is, as viewed in the drawing figure, a topside edge elevational view of the easel latch of FIG. 14A. FIG. 14C is, as viewed in the drawing figure, a left side edge elevational view of the easel latch of FIG. 14A. FIG. 14D is, as viewed in the drawing figure, a front side edge elevational view of the easel latch 105 of FIG. 14A. With reference to FIGS. 14A through 14D, the easel latch 105 may comprise handles 500A and 500B for adjusting the position of the easel extension 100. For tracking over the easel tracks 380A and 380B, the easel latch 105 may further comprise tabs 505A and 505B, each having a ratchet 510, 510A and 510B formed at the respective distal ends. In operation, by imparting a selected movement to the easel extension 100 either in an upward or downward direction through the easel latch 105, a desired height for the support 75 may be configured.

Figure 15:
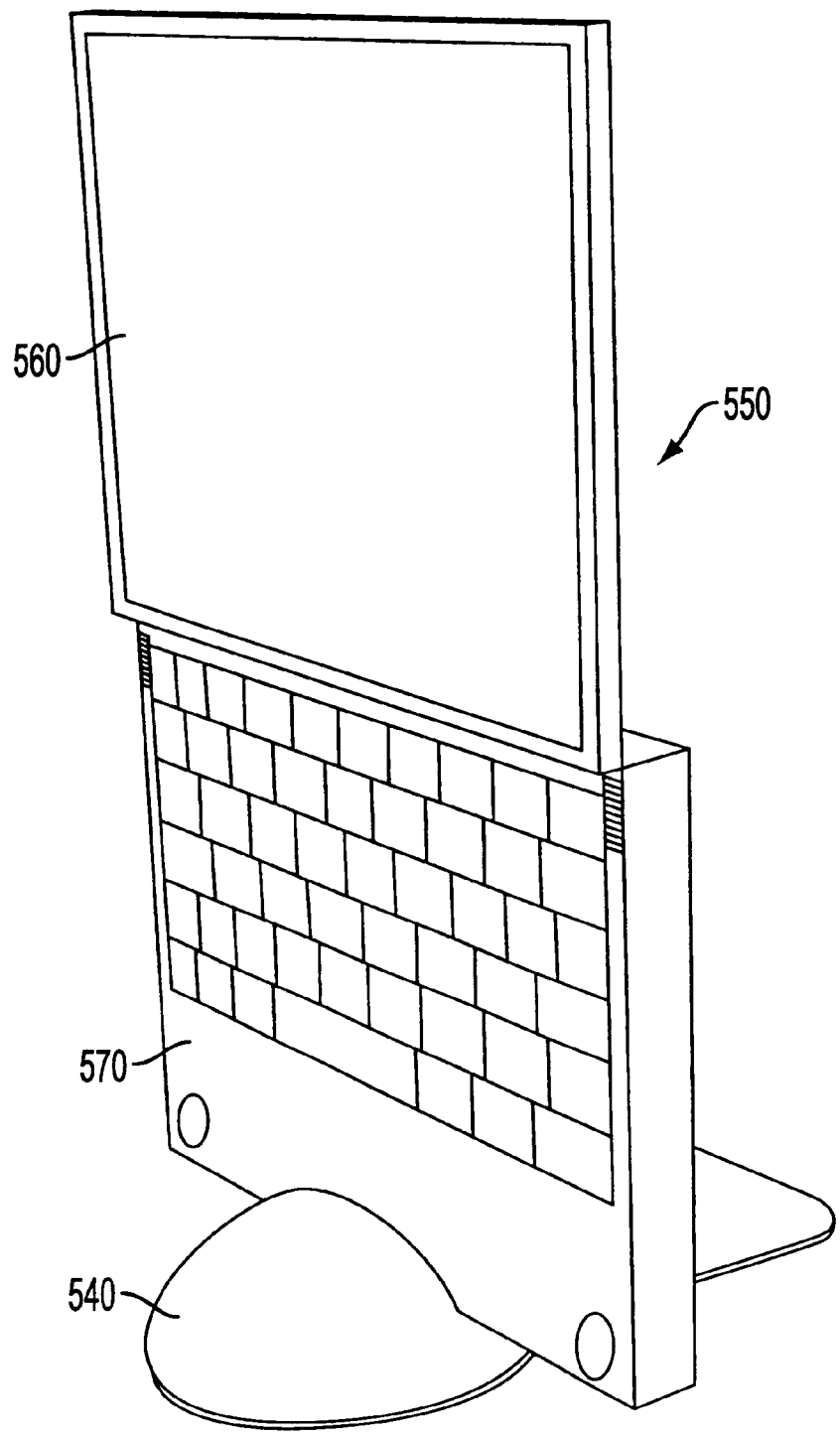
FIG. 15 is a perspective view of an exemplary application for the portable computer pedestal of FIG. 1 with a portable computer being removably docked therein to provide an ergonomic viewing position in accordance with one aspect of the present invention.

FIG. 15 is a perspective view of a laptop computer pedestal 540 with a laptop computer 550 being removably docked therein to provide an ergonomic viewing position in accordance with one aspect of the present invention. In particular, FIG. 15 shows the laptop computer 550 having a laptop screen 560 and a laptop base 570 disposed in a vertical orientation. With the laptop computer 550 fully opened and positioned on edge, the laptop screen 560 is substantially higher than laptop base 570.

The laptop computer pedestal 540 could comprise a variety of materials including, but not limited to, metallic, plastic, ceramic, alloy, and/or wood. For manufacturing, the significant features for the materials that may determine a particular choice may include the desired strength of the laptop computer pedestal 540 to handle the laptop computer 550.

As examples, fabrication of the various components could range between solid, extruded or molded pieces, to metallic frames or chassis covered in plastic, to wood-milled and constructed parts painted finished or covered in plastic, to injection molded plastics, to plastic forms filled with sand or metal. Such manufacturing materials may substantially resemble that commonly used for manufacturing of typical laptop computers. Moreover, any suitable fabrication technology, in a known manner, can be generally employed to fabricate the laptop computer pedestal 540 for use with a variety of electronic applications.

Accordingly, the invention generally has the added benefit of providing a relatively more desirable ergonomic position of the laptop screen 560 as opposed to the conventional usage of typical laptop computers. The resulting vertical orientation of the laptop screen 560, therefore, may significantly reduce eyestrain and reflections from overhead light sources. In addition, the laptop computer pedestal 540 can accommodate variations of laptop computer designs.

One implementation of the laptop computer pedestal 540 may include a mouse and/or keyboard accessory for easier operation of the laptop computer 550 when secured therewith. It may also include a cover for the keypad portion of the laptop computer 550 for a more attractive presentation. Another embodiment of the laptop computer pedestal 540 may include a housing engineered to fit around the laptop base 570, and hinged onto the laptop computer pedestal 540 in such a way as to allow the laptop computer 550 a full range of motion form horizontal to vertical directions. This could also allow accessibility to peripheral devices generally located at the front of the laptop base 570.

In accordance with one aspect of the present invention, a method may provide a base having a recess formed for receiving a portable device having a desktop portion and a display portion. In addition, an anchor may be provided for engaging the desktop portion in the recess of the base. The anchor could be operably coupled to the base. Furthermore, for holding the display portion of the portable device, a support may be provided. The support could be pivotally coupled to the base. Finally, the desktop portion may be interposed in the recess for ergonomically positioning the portable device.

The method may further comprise engaging the desktop portion for releasably locking the desktop portion in the recess of the base in a secure relationship therewith. Likewise, the method may further comprise latching the display portion for releasably holding the display portion with the support in a secure relationship therewith.

According to another aspect of the present invention, the base, anchor, and support may be configured to form a portable computer pedestal. Moreover, the portable computer pedestal could be operative in a manner to cause the portable device to position in a vertical orientation relative to the base. The vertical orientation may include an ergonomic viewing position for the portable device.

More specifically, for orienting a portable computer having a desktop portion and a display screen in an ergonomic viewing position, a method may comprise providing a pedestal base having a housing formed for receiving the desktop portion of the portable computer. An anchor may be provided for releasably engaging the desktop portion in the housing of the pedestal base. Further, for releasably holding the display screen of the portable computer, a support may be provided. The method may further include causing the display screen of the portable computer to be disposed at the ergonomic viewing position in response to placement of the desktop portion in the housing while the display screen being supported by the support.

Figure 16A:
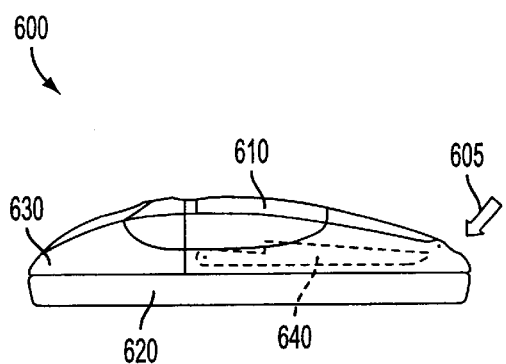
FIG. 16A is a view of an exemplary embodiment of a portable laptop computer pedestal being activated responsive to a first user action in accordance with one aspect of the present invention.
Figure 16B:
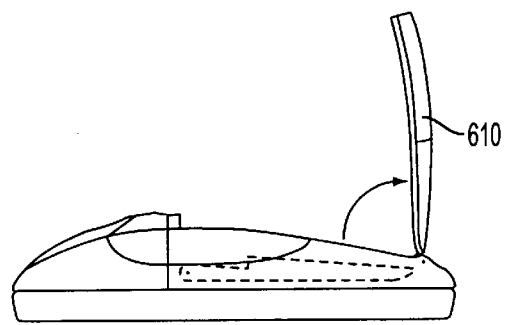
FIG. 16B is a view of the portable laptop computer pedestal of FIG. 16A illustrating a pedestal door being opened away from a base anchor movably coupled to a pedestal base.
Figure 16C:
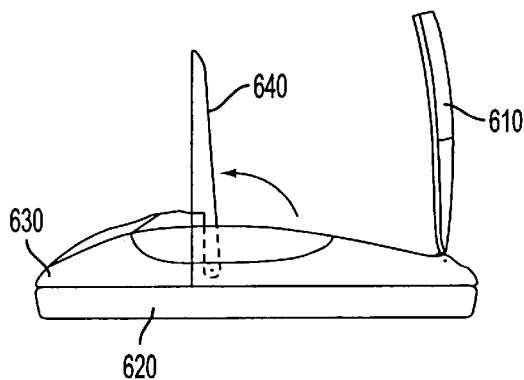
FIG. 16C is a view of the portable laptop computer pedestal of FIG. 16B illustrating a pedestal support being pivotally oriented in a vertical orientation.
Figure 16D:
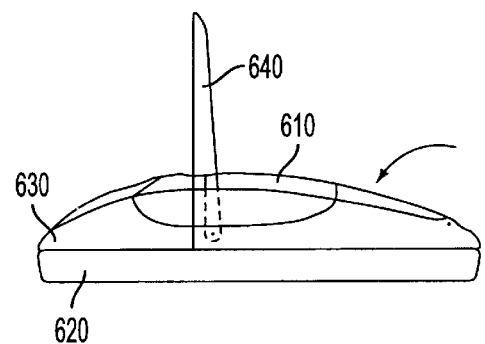
FIG. 16D is a view of the portable laptop computer pedestal of FIG. 16C illustrating the pedestal door being closed with the pedestal support positioned in the vertical orientation.

FIGS. 16A through 16D relate to an activation process of an exemplary embodiment of a portable laptop computer pedestal 600 in accordance with one aspect of the present invention. With reference to FIGS. 16A through 16D, in particular, FIG. 16A is a view of the portable laptop computer pedestal 600 being activated responsive to a first user action 605. For example, the first user action 605 could entail pressing a button (not shown) to initiate an automatic operation of unfolding of the portable laptop computer pedestal 600. In FIG. 16B, a pedestal door 610 is being generally opened away from a pedestal base 620 and a base anchor 630. FIG. 16C is a view of the portable laptop computer pedestal 600 illustrating a pedestal support 640 being pivotally oriented in a vertical orientation generally indicated by an arrow 645. As shown in FIG. 16D, the pedestal door 610 is being closed and the pedestal support 640 positioned in the vertical orientation to receive a portable laptop computer generally having a desktop portion generally including a keyboard, and a display screen. Accordingly, the portable laptop computer can be readily oriented in a desired ergonomic viewing position.

Figure 17A:
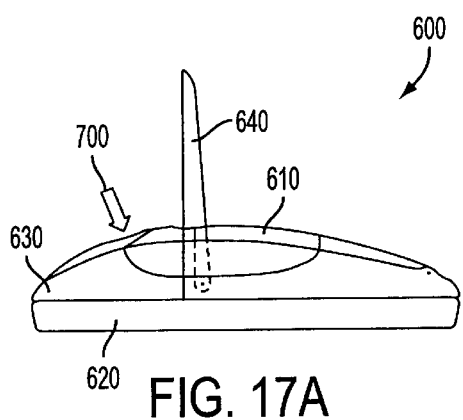
FIG. 17A is a view of the portable laptop computer pedestal of FIG. 16D being activated responsive to a second user action in accordance with one aspect of the present invention.
Figure 17B:
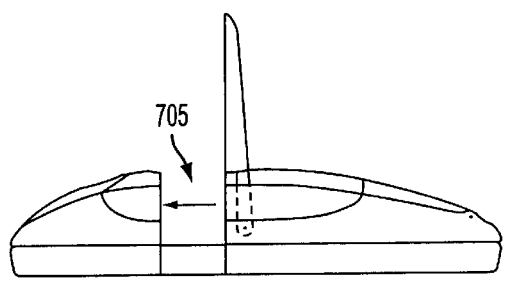
FIG. 17B is a view of the portable laptop computer pedestal of FIG. 17A illustrating pedestal housing being provided with the base anchor moving away from the pedestal base.
Figure 17C:
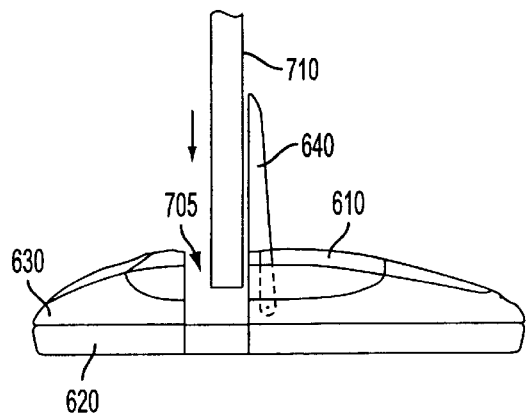
FIG. 17C is a view of the portable laptop computer pedestal of FIG. 17B illustrating a portable laptop computer being disposed in the pedestal housing in a vertical orientation.
Figure 17D:
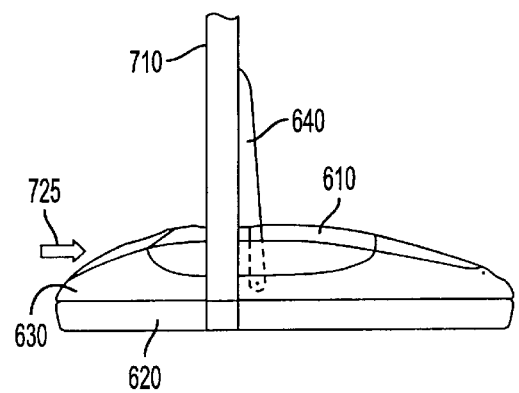
FIG. 17D is a view of the portable laptop computer pedestal of FIG. 17C illustrating the base anchor movement towards the pedestal base for securely engaging a first portion of the portable laptop computer in the pedestal housing while a second portion of the portable laptop computer being held by the pedestal support to provide an ergonomic viewing position thereto.

FIGS. 17A through 17D relate to a clamping process of the portable laptop computer pedestal 600 in accordance with one aspect of the present invention. Referring to FIGS. 17A through 17D, specifically, FIG. 17A is a view of the portable laptop computer pedestal 600 being activated responsive to a second user action 700. As the base anchor 630 is movably coupled to the pedestal base 620, in FIG. 17B, a pedestal housing 705 is being provided with the base anchor 630 moving away from the pedestal base 620. Next, disposing a portion of a representative computer 710 within the pedestal housing 705 in a vertical upright orientation is illustrated in FIG. 17C. As shown by a representative arrow 725 in FIG. 17D, the base anchor 630 moves towards the pedestal base 640 for securely engaging the portion of the representative computer 710 within the pedestal housing 705 while the rest of the representative computer is being held by the pedestal support 640 to provide the desired ergonomic viewing position.

The foregoing describes only one embodiment of the present invention; however, many variations of this embodiment will be obvious to a person skilled in the art of computer parts fabrication. Certainly, various other materials and techniques can be utilized in the construction of the various components of the pedestal.

Moreover, other implementations can be readily contemplated. For example, in one embodiment, a portable computer pedestal comprises a pedestal base and a vertical support, which can be folded together to provide a compact design and ease of portability. The portable computer pedestal securely holds a portable computer having a display screen in a suitable position to enable an ergonomic viewing position level of the display screen, which is significantly higher than a conventional viewing position level of the display screen. In addition, the portable computer pedestal may secure the portable computer by any means known in the art. For example, the portable computer could be secured to the pedestal base by means including, but is not limited to, an elastic cord, a locking device, a built-in clamping mechanism or any other similar housing mechanism. To firmly secure the portable computer in a desired ergonomic position, the portable computer pedestal may employ Velcro or the alike.

According to another embodiment, a laptop computer is secured to a stand by an elastic cord that hooks from the stand around the front and back to the stand. According to another embodiment, the laptop computer is secured to the stand by means of a mechanically installed locking device. According to another embodiment, the laptop computer is secured by means of a clamping mechanism built into the base of the pedestal. According to another embodiment, the laptop computer is secured to the stand by means of clamping appendages that secures the laptop computer to the stand. According to the invention, the pedestal can have a stand that can be folded into, onto, or next to the base to make it compact when not in use. According to the invention, the pedestal may house any variety of accessories for the laptop, such as speakers, ports, electrical plugs, business card holder or pencil holder, or computer mouse storage.

Generally speaking, it is a feature of the present invention to position a laptop computer having a display screen opened to 180 degrees in a vertical orientation and positioning the display screen at a higher vantage point relative to a height provided by conventional means. Another feature of the present invention is to provide a stand modularly integrated with the laptop computer for positioning the display screen at a desired height to enable an easy viewing thereof by a group of two or more persons. It is also a feature to provide a stand that positions the display screen at such a height so that with the use of an optional keyboard, a mouse and/or other accessories the laptop computer becomes substantially more ergonomically situated for a typical user and/or users. Another feature is that the invention could be a portable and readily collapsible design of a pedestal, which readily transforms into a streamlined and easily transportable size and shape. Yet another feature of the present invention is to position the display screen at a substantially vertical position so as to prevent reflection from overhead light sources, reducing eyestrain and improving the display screen viewability and image quality. It is also a feature of the present invention to provide an aesthetic presentation of the laptop computer in the vertical orientation. It is also a feature of the present invention to incorporate a cover to hide the laptop keyboard when the laptop computer is oriented in the substantially vertical position.

It is also a feature of the present invention to accommodate different sizes and shapes of laptops computer that vary by manufacturer, make and/or model. For example, in one embodiment to have attachment to a pedestal, such as a sleeve, housing or slot configured to accommodate different sizes and shapes of laptop computers which vary by manufacturer, make and/or model. It is a further feature of the invention for the aforementioned housing attachment be able to pivot through a full range of positions from horizontal to vertical, and to provide for accessibility to one or more device openings generally located at the front (when in horizontal orientation) of a laptop computer. It is also a feature of the present invention to provide unrestricted access to one or more ports, plugs, and other items located on the back and/or sides of the laptop computer.

Although the present invention and its advantages have been described in detail, it should be understood that various changes, substitutions and alterations can be made to the embodiments herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A support apparatus, comprising:
    a base having a recess formed to receive a portable device, the portable device having a desktop portion and a display portion;
    an anchor movably coupled to said base, the anchor formed to engage the portable device when said desktop portion of said portable device is disposed in the recess of said base; and
    a support operably coupled to said base, the support extending upwardly from the base, said support including a mounting portion formed to hold the display portion of said portable device, the desktop portion being disposed adjacent to the mounting portion in a secure relationship therewith, the support being hinged onto said base for selectively orienting the portable device by moving the display portion with respect to the base.

2. The apparatus of claim 1, further comprising:
a locking mechanism for the anchor to releasably engage the desktop portion within the recess of said base in a secure relationship therewith.

3. The apparatus of claim 1, further comprising:
a latching mechanism for the support to releasably hold the display portion in a secure relationship therewith.

4. The apparatus of claim 1, said portable device includes a laptop computer.

5. The apparatus of claim 1, said portable device includes a notebook computer.

6. A support apparatus, comprising:
a base having a recess formed to receive a portable device, the portable device having a desktop portion and a display portion;
an anchor movably coupled to said base, the anchor formed to engage the portable device when said desktop portion of said portable device is disposed in the recess of said base; and
a support operably coupled to said base, the support extending upwardly from the base for holding the display portion of said portable device;
said base, anchor, and support are configured to form a pedestal operative in a manner to cause said portable device to position in a vertical orientation relative to said base, said vertical orientation including an ergonomic viewing position for the portable device, said ergonomic viewing position including a portable device position with the display portion opened to 180 degrees from the desktop portion in a vertical plane relative to said base.

7. A support apparatus, comprising:
a base having a recess formed to receive a portable device, the portable device having a desktop portion and a display portion;
an anchor movably coupled to said base, the anchor formed to engage the portable device when said desktop portion of said portable device is disposed in the recess of said base; and
a support operably coupled to said base, the support extending upwardly from the base for holding the display portion of said portable device, said display portion being operative in a manner to cause the display portion of said portable device to orient in a plane substantially parallel to the desktop portion.

8. The apparatus of claim 7, further comprising:
an activation mechanism for automatically sliding the anchor, in a horizontal plane, away from the base to receive one end of the desktop portion of said portable device within said recess.

9. The apparatus of claim 7, said base, anchor, and support are configured to fold in a manner to provide a portable pedestal.

10. The apparatus of claim 8, said activation mechanism includes a button.

11. The apparatus of claim 8, said activation mechanism further comprising:
an ejector mechanism for causing the support to automatically move in a predetermined position, the predetermined position of said support facilitates clamping of said display portion of the portable device thereto.

12. The apparatus of claim 11, further comprising:
a release mechanism for disengaging the anchor from the base to decouple said one end of the desktop portion of said portable device, said release mechanism includes a lever.

13. A portable computer pedestal for selectively orienting a portable computer having a desktop portion and a display screen in an ergonomic viewing position, comprising:
a pedestal base having a housing formed to receive said portable computer; and
a support having a mounting portion, the support is movably coupled to the pedestal base to releasably engage the portable computer responsive to the placement of said desktop portion in the housing of said pedestal base, the desktop portion being disposed adjacent to the mounting portion in a secure relationship therewith, the support being operative in a manner to cause the display screen of said portable computer to orient in a plane substantially parallel to the desktop portion.

14. A method, comprising:
providing a base having a recess formed to receive a portable device having a desktop portion and a display portion;
providing an anchor for engaging the desktop portion in the recess of said base;
providing a support for holding the display portion of said portable device; and
interposing the desktop portion in said recess for ergonomically positioning said portable device with said display portion oriented in a plane substantially parallel to a plane of the desktop portion.

15. The method of claim 14, further comprising:
engaging the desktop portion for releasably locking the desktop portion in the recess of said base in a secure relationship therewith.

16. The method of claim 14, further comprising:
latching the display portion for releasably holding the display portion with the support in a secure relationship therewith.

17. The method of claim 14, said portable device includes a laptop computer.

18. The method of claim 14, said portable device includes a notebook computer.

19. The method of claim 14, said base, anchor, and support are configured to form a pedestal.

20. The method of claim 19, said pedestal includes a portable computer pedestal.

21. The method of claim 19, said pedestal is operative in a manner to cause said portable device to position in a vertical orientation relative to said base.

22. The method of claim 21, said vertical orientation includes an ergonomic viewing position for the portable device.

23. A method for orienting a portable computer having a desktop portion and a display screen in an ergonomic viewing position, comprising:
providing a pedestal base having a housing formed to receive said desktop portion of the portable computer;
providing an anchor for releasably engaging the desktop portion in the housing of said pedestal base;
providing a support for releasably holding the display screen of the portable computer; and
causing the display screen of the portable computer to be disposed at said ergonomic viewing position in response to placement of the desktop portion in said housing while the display screen being supported by said support with the display screen oriented in a plane substantially parallel to a plane of the desktop portion.

24. A support apparatus, comprising:
a first portion;

a second portion operably coupled to said first portion for providing vertical support thereon; and a third portion movably coupled to said first portion, the third portion formed to provide a housing between the first portion and the third portion;

a fourth portion fixedly coupled to the third portion and movably coupled to the first portion, the fourth portion formed to provide said housing responsive to an activation.

25. The apparatus of claim 24, the activation is operative in a manner to cause either:

a release of said second portion from the first portion responsive to a first user activation, the first user activation provides said housing; or an engagement of said second portion with the first portion responsive to a second user activation, the second user activation securely engages said first portion with said second portion.

26. The apparatus of claim 24, the first portion is a back bezel.

27. The apparatus of claim 24, the second portion is an easel.

28. The apparatus of claim 24, the third portion is a front bezel.

29. The apparatus of claim 24, the fourth portion is a pedestal base.

* * * * *

UNITED STATES PATENT AND TRADEMARK OFFICE
CERTIFICATE OF CORRECTION

PATENT NO. : 6,608,749 B2
DATED : August 19, 2003
INVENTOR(S) : Hubbard, David A.

It is certified that error appears in the above-identified patent and that said Letters Patent is hereby corrected as shown below:

Column 17,
Line 2, delete "and".
Line 5, after "third portion;" insert -- and --.

Signed and Sealed this

Twenty-third Day of December, 2003

JAMES E. ROGAN
*Director of the United States Patent and Trademark Office*